United States Patent

Welford et al.

[15] 3,706,429

[45] Dec. 19, 1972

[54] MISSILE PROPORTIONAL NAVIGATION SYSTEM USING FIXED SEEKER

[72] Inventors: Gordon D. Welford; Buster E. Kelley, both of Huntsville, Ala.

[73] Assignee: The United States of America as represented by the Secretary of the Navy

[22] Filed: Jan. 14, 1970

[21] Appl. No.: 7,325

[52] U.S. Cl. ................................................244/3.19
[51] Int. Cl. ........F41g 7/00, F42b 15/02, F42b 15/10
[58] Field of Search.....................................244/3.19

[56] References Cited

UNITED STATES PATENTS 3,189,300  6/1965  Robert ..............................244/3.19
3,223,357  12/1965  Broecker-Steinkuhl..............244/3.19
3,165,749  1/1965  Cushner ..........................244/3.19 X

*Primary Examiner*—Benjamin A. Borchelt
*Assistant Examiner*—Thomas H. Webb
*Attorney*—Harry M. Saragovitz, Herbert Berl and Aubrey J. Dunn

[57] ABSTRACT

The outputs of a fixed array detector are employed as inputs to a homing missile steering system using proportional navigation. The seeker outputs are in the form of quantized signals, and are summed with gyro-derived attitude signals to produce missile control signals.

3 Claims, 1 Drawing Figure

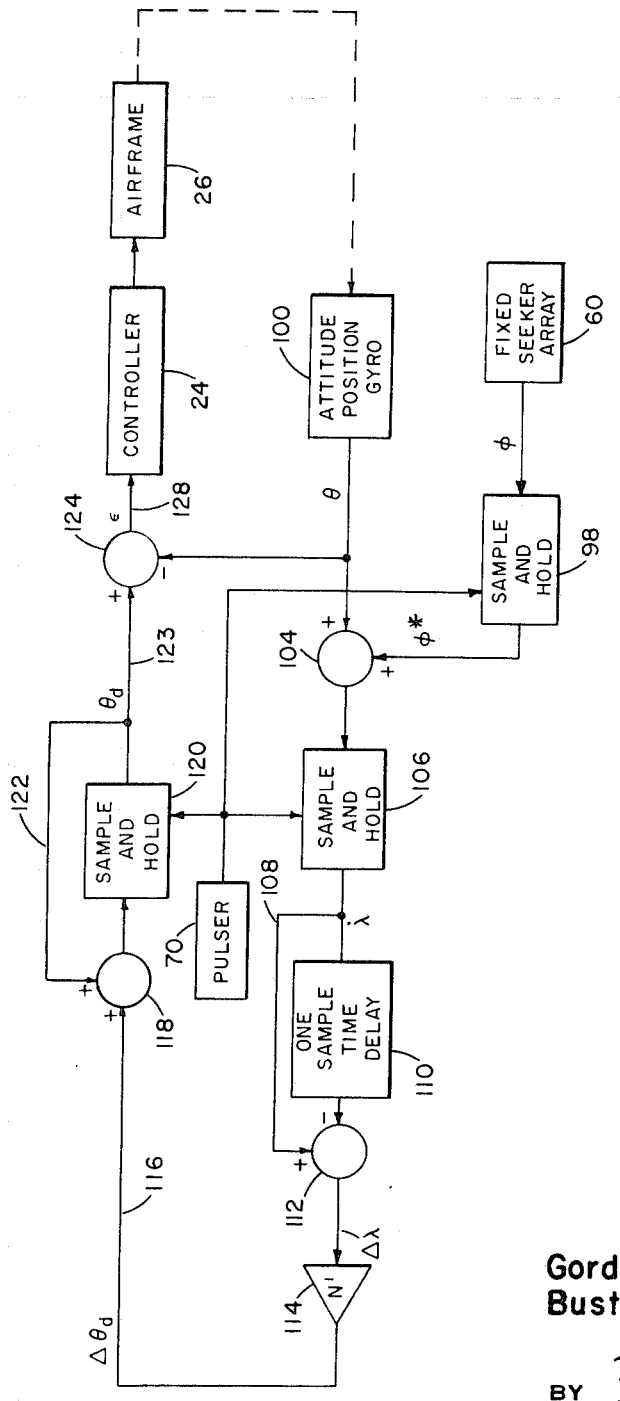

MISSILE PROPORTIONAL NAVIGATION SYSTEM USING FIXED SEEKER

BACKGROUND OF THE INVENTION

This invention is in the field of guided missiles which employ proportional navigation systems. Proportional navigation is a guidance technique currently used in missiles homing on moving targets. The homing may be passive, active, or semi-active. The technique requires measurement of the rate-of-change of line-of-sight(s) between the missile and a target. This measurement is usually accomplished with a gimbaled seeker on the missile. The seeker continuously tracks the target by torques applied to its gimbals, with the average torques providing line-of-sight rates. Navigation angles are computed from the line-of-sight rates. Alternatively, the line-of-sight rate is determined by differentiating a signal from a gimbal angle pickoff and subtracting this signal from a gyro-derived missile attitude rate signal. A gimbaled seeker for this purpose requires a two-degree-of-freedom gimbal, two independent servo loops (including torquers), and a two-degree-of-freedom position or rate gyro.

Fixed seekers are well known and have some desirable features, but are not employed in proportional navigation. Their use has been limited to simple pursuit problems, primarily because of the problem of accurately determining the line-of-sight rate signal.

The instant invention is able to combine the desirable features of a fixed seeker and a proportional navigation system.

SUMMARY OF THE INVENTION

A homing missile with a proportional navigation system employs a fixed array seeker for determining line-of-sight of a target. The seeker has quantized output signals, which signals are summed with gyro-derived attitude signals. The sum signals are subsequently sampled and combined with themselves to provide control signals.

BRIEF DESCRIPTION OF THE DRAWING

The single drawing FIGURE shows a schematic diagram of the invention, for one servo system.

DESCRIPTION OF THE PREFERRED EMBODIMENT

In this description, it is assumed that a target on which the missile is homing presents a continuous image to fixed seeker array 60 of the drawing. That is, the target is not being illuminated with pulsed energy, (for active of semi-active homing), nor is it emitting pulsed energy (for passive homing). Array 60 may consist of a matrix of photodetectors (for visible and IR radiation) or horns (for UHF, etc.) but its particular makeup is unimportant to the invention. It is assumed that the target image is of such size that only one element of the array is illuminated at any one time, and that the array has a descrete output for each element. This may be accomplished by having the array in a matrix of rows and columns, with the rows connected in one ladder network to give an output for vertical angles, and with the columns connected in another ladder network to give an output for horizontal angles. For the sake of simplicity, only one output will be considered in describing the invention. Obviously, the other output may be used to control another servo loop in similar manner to the one herein described. The output of 60 is designated $\phi$ on the drawing, and is applied to sample-and-hold circuit 98. The output of 98 is designated $\phi^*$ and is applied to an input of summing network 104. Also applied to 104 is an attitude signal $\theta$ from attitude position gyro 100. The output of 104 is applied to sample-and-hold circuit 106. The output $\lambda$ from 106 is the output at the ith sampling instant. It should be understood that sample-and-hold circuits 98, 106, and 120 (yet to be described) all are operated by pulser 70, which pulser generates short pulses which cause each of these circuits to periodically sample their inputs, and hold the level thereof until the next sample period. Output $\lambda$ is delayed by one sample pulse period in delay circuit 110 and is applied to an input of summing network 112. The output $\lambda$ is also applied directly to another input of 112. The output from 112 is the difference between its inputs and is proportional to the rate-of-change of $\lambda$, or $\Delta\lambda$. The $\Delta\lambda$ signal is multiplied by the constant gain factor $N'$ in block 114 to give the "update angle," $\Delta\theta_d$, which is applied to an input of summing network 118. The output of 118 is applied to sample-and-hold circuit 120. The output command angle, $\theta_d$, at the output of sample-and-hold circuit 120, is fed back to another input of summing network 118 by lead 122 and to an input of summing network 124 by lead 123. The signal $\theta_d$ on leads 122 and 123 is the missile attitude command and has subtracted therefrom the true attitude $\theta$ in summing network 124 to give error signal $\epsilon$, on lead 128. Signal $\epsilon$ is applied to controller 24. This controller controls the attitude of airframe 26, for guiding the missile toward an intercept point with the target. The attitude of the air frame is sensed by attitude position gyro 100, to obtain $\theta$.

In the above discussion, it has been assumed that a continuous target radiation was present. If the target is illuminated by a source such as a pulsed laser, it would be necessary to have pulser 70 synchronized with the laser. This could readily be accomplished by a radio transmitter-receiver link between the laser pulser and pulse 70, or by using the pulsed output of the detector array as a trigger for pulser 70.

We claim:

1. A missile guidance system for proportional homing navigation on a target, comprising: a fixed seeker array having an output, for providing a quantized output signal in accordance with the position of a target image on said array; means connected to said output for deriving a control signal related to rate-of-change of said output signal, and missile control means connected to said means for deriving; wherein said means for deriving includes a first summer having inputs and an output; a first sample-and-hold circuit connected between said output of said array and said input of said summer; a second sample-and-hold circuit having an output, and an input connected to the output of said first summer; a one sample time delay circuit having an output, and an input connected to the output of said second sample-and-hold circuit; a second summer having an output, and having inputs respectively connected to the output of said delay circuit and said output of said second sample-and-hold circuit; a third summer having an output and inputs; an amplifier connected between said output of said second summer and an input of said third summer; a third sample-and-hold circuit having an input connected to the output of said third summer and having an output; a fourth summer having an output, and inputs, with one of said inputs connected to said output of said third sample-and-hold circuit; said output of said third sample-and-hold circuit being connected to another input of said third summer; and said missile control means including an airframe controller having an input connected to the output of said fourth summer; said means for deriving further including means for determining missile attitude having an output connected to an input of each of said first and fourth summers.

2. The system as defined in claim 1 wherein said amplifier has an amplification factor equal to the navigation factor of the missile.

3. The system as defined in claim 2 wherein said second and fourth summers include means to determine the difference between signals applied to the inputs thereof.

* * * * *

UNITED STATES PATENT OFFICE
CERTIFICATE OF CORRECTION

Patent No. 3,706,429   Dated December 19, 1972

Inventor(s) Gordon D. Welford et al.

It is certified that error appears in the above-identified patent and that said Letters Patent are hereby corrected as shown below:

On the cover sheet [73] "The United States of America as represented by the Secretary of the Navy" should read -- The United States of America as represented by the Secretary of the Army --.

Signed and sealed this 26th day of February 1974.

(SEAL)
Attest:

EDWARD M. FLETCHER, JR.
Attesting Officer

C. MARSHALL DANN
Commissioner of Patents